US 8,814,591 B2

(12) United States Patent
Pong

(10) Patent No.: US 8,814,591 B2
(45) Date of Patent: Aug. 26, 2014

(54) TEXTURING AN LED OPENING IN A CONNECTOR BODY

(75) Inventor: Joshua Pong, San Jose, CA (US)

(73) Assignee: Apple Inc., Cupertino, CA (US)

(*) Notice: Subject to any disclaimer, the term of this patent is extended or adjusted under 35 U.S.C. 154(b) by 82 days.

(21) Appl. No.: 13/445,897

(22) Filed: Apr. 12, 2012

(65) Prior Publication Data
US 2013/0273770 A1 Oct. 17, 2013

(51) Int. Cl.
*H01R 3/00* (2006.01)

(52) U.S. Cl.
USPC .......................................................... 439/490

(58) Field of Classification Search
USPC .................. 439/489, 488, 490, 535, 536, 523
See application file for complete search history.

(56) References Cited

U.S. PATENT DOCUMENTS

| 4,412,716 A * | 11/1983 | Baba et al. ................. 439/699.2 |
| 4,819,711 A * | 4/1989 | Chancellor .................... 164/456 |
| 7,400,239 B2 * | 7/2008 | Kiko et al. ...................... 340/501 |
| 2004/0201573 A1 * | 10/2004 | Yu et al. ......................... 345/163 |
| 2006/0030203 A1 * | 2/2006 | Ohi et al. ........................ 439/488 |
| 2008/0110391 A1 * | 5/2008 | Taylor et al. ................... 116/216 |
| 2010/0178804 A1 * | 7/2010 | Long ......................... 439/607.31 |

* cited by examiner

*Primary Examiner* — Neil Abrams
*Assistant Examiner* — Phuongchi T Nguyen
(74) *Attorney, Agent, or Firm* — Kilpatrick Townsend & Stockton LLP

(57) ABSTRACT

Connector inserts and receptacles that may have indicators that are easy to manufacture, may have an attractive appearance, reduce reflections, and may provide a consistent indication independent of viewing angle. One example may provide a connector insert having an opening to provide light from an LED. The opening may be filled with an adhesive or other material. A surface of the adhesive may be textured, for example by chemical etch, laser, sand or glass bead blasting, through the use of texture tape or other stamp, or in other ways. An entire connector or just the indication itself may be etched. Masking may be used to protect a connector body during texturing.

20 Claims, 7 Drawing Sheets

TEXTURING AN LED OPENING IN A CONNECTOR BODY

BACKGROUND

The number and types of electronic devices available to consumers have increased tremendously the past few years, and this increase shows no signs of abating. Devices such as portable computing devices, tablet, desktop, and all-in-one computers, cell, smart, and media phones, storage devices, portable media players, navigation systems, monitors and other devices have become ubiquitous.

These devices often receive and provide power and data using various cable assemblies. These cable assemblies may include connector inserts, or plugs, on one or more ends of a cable. The connector inserts may plug into connector receptacles on electronic devices, thereby forming one or more conductive paths for signals and power.

The connector inserts may be formed of housings that typically at least partially surround, and provide mechanical support for, a number of contacts. These contacts may be arranged to mate with corresponding contacts on the connector receptacles to form portions of electrical paths between devices.

Various connector inserts and receptacles may provide indications that a connection has been made and that these electrical paths have been formed. But these indications may be small and difficult to manufacture. Also, since they are designed to be viewed by a user, it may be desirable to provide indications having an attractive appearance.

Moreover, these indications may be subject to falsely providing an indication that a connection has been made. For example, where the indication is provided by a light-emitting diode, reflections on the indication may lead a user to an erroneous conclusion that a connection has been made. Further, the appearance of the indication may vary depending on an angle of a user's sight-line to a surface of the indication.

Thus, what is needed are connector inserts and receptacles that may have indicators that are easy to manufacture, may have an attractive appearance, reduce reflections, and may provide a consistent indication independent of viewing angle.

SUMMARY

Accordingly, embodiments of the present invention may provide connector inserts and receptacles that may have indicators that are easy to manufacture, may have an attractive appearance, reduce reflections, and may provide a consistent indication independent of viewing angle.

An illustrative embodiment of the present invention may provide a connector insert or receptacle having an opening to provide light from a light-emitting diode (LED). The LED may emit light when a connection between a connector insert and connector receptacle is formed. The LED may be located on a circuit board in a connector insert. One or more light pipes may be used to direct light emitted from the LED to an opening in a housing of the connector insert, where it may be viewed by a user. In other embodiments, the LED may be located on a circuit board in an electronic device housing a connector receptacle. One or more light pipes may be used to direct light emitted from the LED to an opening in a housing of the electronic device, where it may be viewed by a user.

Another illustrative embodiment of the present invention may provide an opening arranged to pass light from an LED, where the opening has been filled with a transparent or translucent material. In a specific embodiment of the present invention, an adhesive may be used to fill the opening. In other embodiments of the present invention, plastic pieces, or pieces formed of other materials, may be used to fill the opening.

Another illustrative embodiment of the present invention may provide an indication that has reduced reflections. A specific embodiment of the present invention may provide a textured surface on the indication. The indication may be an opening in a housing for light emitted by an LED, where the opening has been filled using an adhesive, plastic, or other material. This texturing may improve the appearance of the indication, and diffuse emitted light such that the indication appears consistent despite changes in viewing angles.

In various embodiments of the present invention, an indication may be textured in various ways. For example, a chemical etch may be used to provide a texture on a surface of the indication. In other examples, particles, such as sand or glass beads, may be directed at a surface of an indication, such that the surface is textured. In other embodiments of the present invention, a laser may be used to etch a pattern in a surface of an indication. This pattern may be crosshatched or other pattern. In still other embodiments of the present invention, texture tape or other pattern or stamp may be used to texture a surface of an indication. For example, where the indication is an LED opening filled with adhesive or epoxy, the adhesive or epoxy can be textured using texture tape or other pattern or stamp before the adhesive or epoxy has cured.

In various embodiments of the present invention, the texturing may be done in various ways. For example, in some embodiments, the texturing method is directed only at an indication, such as an LED opening, itself. For example, where a laser is used to etch a surface of an indication, the laser is directed only at the indication. Surrounding portions of a connector insert or receptacle are not targeted by the laser. In other embodiments, an entire insert or receptacle may be subjected to the texturing agent. For example, where a chemical etch is used, the body of a connector insert, not just the indication, may be subjected to the chemical etch. The body of the connector insert or receptacle may be formed of material that is not affected by the chemical etch, or it may be that the result of the etch provides a desirable texture for the body of the connector insert. In still other examples, a mask may be used to expose the indication but protect a body of a connector insert or receptacle, such as when sand or glass-bead blasting is used.

Embodiments of the present invention may be used to improve various connector inserts or receptacles, such as connector inserts and connector receptacles that are compatible with DisplayPort, Thunderbolt, MagSafe, the various Universal Serial Bus interfaces and standards, including USB, USB2, and USB3, as well as High-Definition Multimedia Interface (HDMI), Digital Visual Interface (DVI), power, Ethernet, and other types of interfaces and standards. These connector inserts and receptacles may be utilized with and in many types of devices, such as portable computing devices, tablet, ultrabook, laptop, netbook, desktop, and all-in-one computers, cell, smart, and media phones, storage devices, portable media players, navigation systems, monitors and other devices.

Various embodiments of the present invention may incorporate one or more of these and the other features described herein. A better understanding of the nature and advantages of the present invention may be gained by reference to the following detailed description and the accompanying drawings.

DESCRIPTION OF ILLUSTRATIVE EMBODIMENTS

Figure 1:
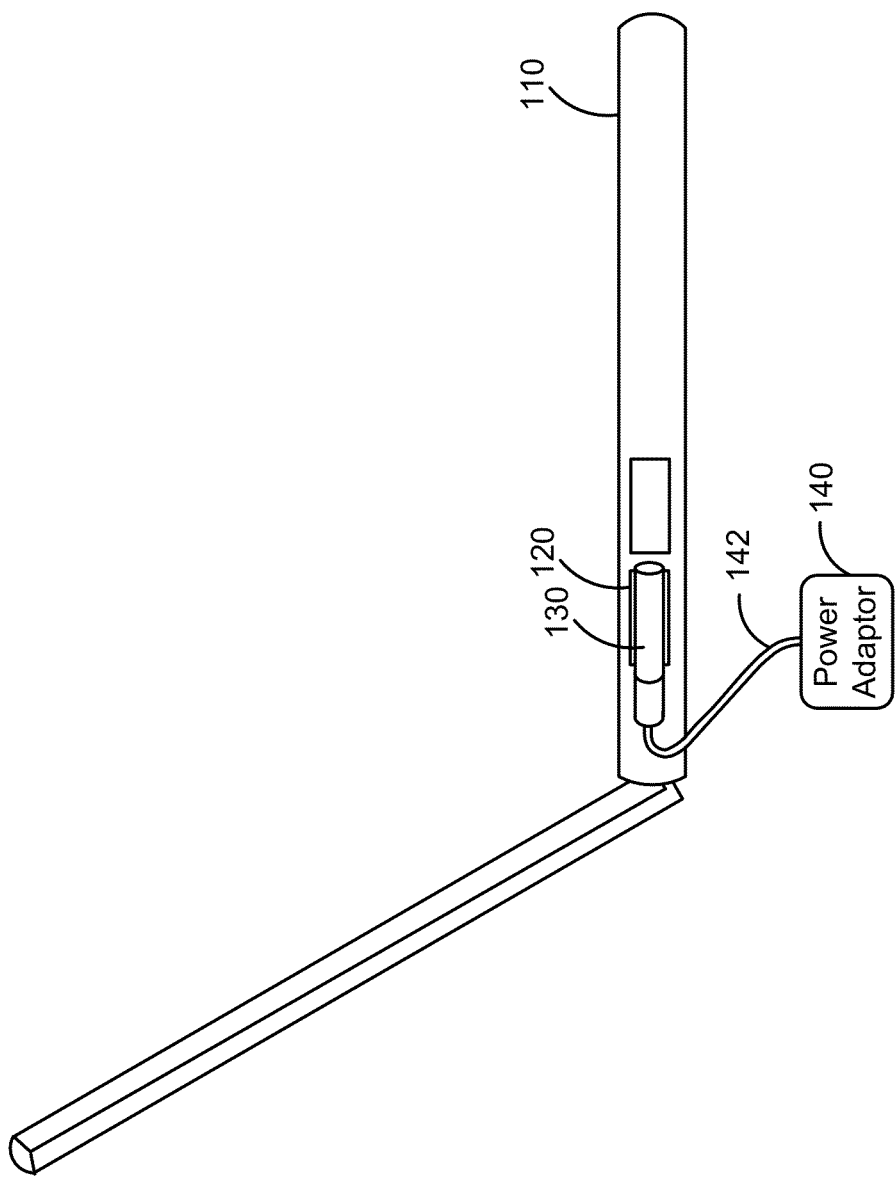
FIG. 1 illustrates an electronic system that may be improved by the incorporation of embodiments of the present invention.

FIG. 1 illustrates an electronic system that may be improved by the incorporation of an embodiment of the present invention. In this example, the electronic device may be a laptop computer 110 having a connector receptacle 120. Connector insert 130 may be arranged to mate with connector receptacle 120. Power adapter 140 may receive power from a wall-socket, vehicle power supply, host device, or other source, and provide power to connector insert 130 via cable 142. Connector insert 130 may in turn provide power to connector receptacle 120. In other embodiments of the present invention, connector receptacle 120, connector insert 130, and cable 142 may transfer power, data, status, or other types of electronic, optical, or other types of signals.

In this specific example, connector receptacle 120 and connector insert 130 may be Thunderbolt, MagSafe, or DisplayPort connector receptacles and inserts. In other embodiments of the present invention, other types of connector receptacles and inserts may be improved by the incorporation of embodiments of the present invention. These may include the various USB standards, as well as High-Definition Multimedia Interface (HDMI), Digital Visual Interface (DVI), power, Ethernet, and other types of interfaces and standards.

Device housing 110 may be representative of many types of devices, such as portable computing devices, laptop, ultrabook, netbook, tablet, desktop, and all-in-one computers, cell, smart, and media phones, storage devices, portable media players, navigation systems, monitors and other devices.

It may be desirable to inform a user who is making a connection between connector insert 130 and connector receptacle 120 that such a connection has been formed. Accordingly, embodiments of the present invention may provide an indication that such a connection has been made. In other embodiments of the present invention, an indication may be provided that the connection has not been made, or other indications may be provided to indicate that various types of connections have or have not been made.

In one embodiment of the present invention, light provided by a light-emitting diode may be used to indicate that a connection has been made between connector insert 130 and connector receptacle 120. A light-emitting diode may be located on either or both connector insert 130 and connector receptacle 120. Examples of connector inserts having indications provided by light-emitting diodes are shown in the following figures.

Figure 2:
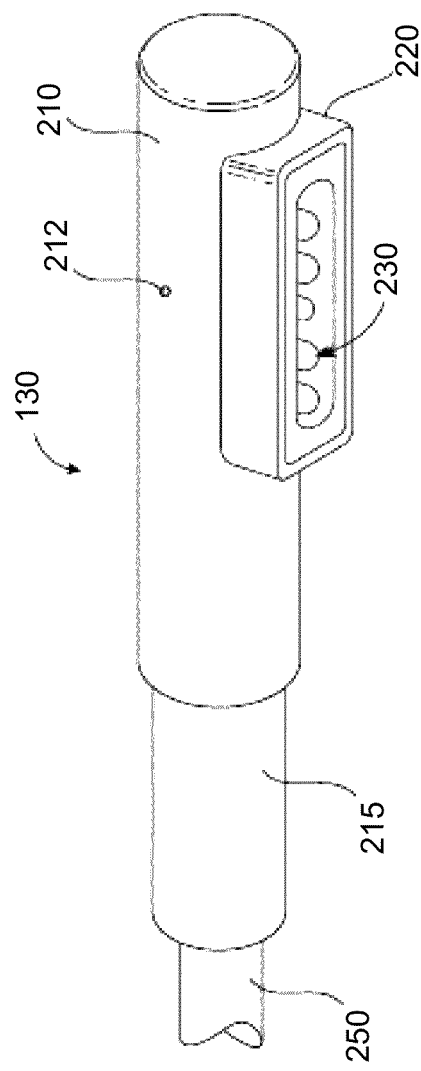
FIG. 2 illustrates a connector insert that may be improved by the incorporation of an embodiment of the present invention.

FIG. 2 illustrates a connector insert that may be improved by the incorporation of an embodiment of the present invention. Connector insert 130 may include housing 210 having an opening 212. Connector insert 130 may further include an attraction plate 220 surrounding a number of contacts 230. These contacts may connect to conductors inside cable 250. Cable 250 may be protected from wear by strain relief 215.

In various embodiments of the present invention, housing 210 may include one or more openings 212. These openings may be positioned in various locations where they may be viewed by a user who is forming a connection between connector insert 130 and a corresponding connector receptacle, such as connector receptacle 120 in FIG. 1.

Figure 3:
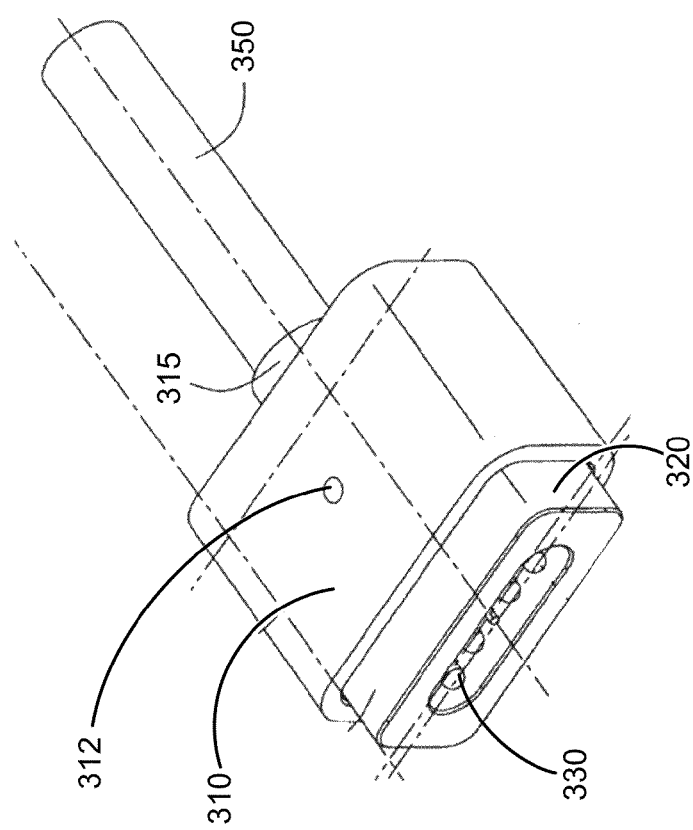
FIG. 3 illustrates another connector insert that may be improved by the incorporation of an embodiment of the present invention.

FIG. 3 illustrates another connector insert that may be improved by the incorporation of an embodiment of the present invention. Connector insert 300 may include housing 310 having an opening 312. Connector insert 300 may further include an attraction plate 320 surrounding a number of contacts 330. Contacts 330 may be connected to conductors inside cable 350. Cable 350 may be protected from wear by strain relief 315.

Again, in various embodiments of the present invention, housing 310 may include one or more openings 312. These openings may be positioned in various locations where they may be viewed by a user who is forming a connection between connector insert 300 and a corresponding connector receptacle, such as connector receptacle 120 in FIG. 1.

Figure 4:
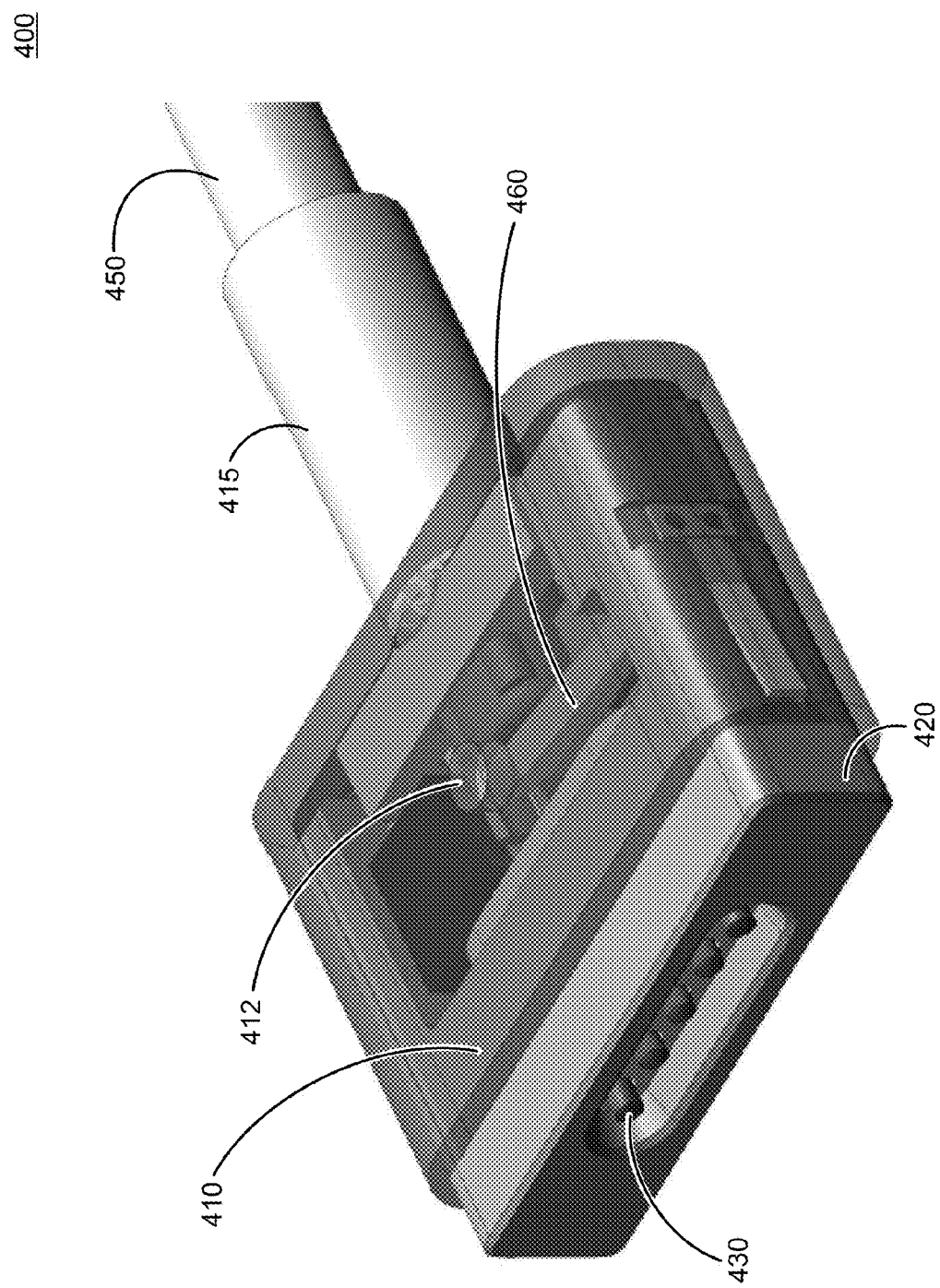
FIG. 4 illustrates another connector insert that may be improved by the incorporation of an embodiment of the present invention.

FIG. 4 illustrates another connector insert that may be improved by the incorporation of an embodiment of the present invention. Connector insert 400 may include housing 410 having opening 412. Connector insert 400 may further include an attraction plate 420 surrounding a number of contacts 430. Contacts 430 may be connected to conductors inside cable 450. Cable 450 may be protected from wear by strain relief 415. As before, in various embodiments of the present invention, housing 410 may include one or more openings 412. These openings may be positioned various occasions where they may be viewed by a user who is forming a connection between connector insert 400 and a corresponding connector receptacle, such as connector receptacle 120 in FIG. 1.

In this example, when a connection is made between connector insert 400 and a corresponding connector receptacle, light emitting diodes (not shown) on a circuit board (not shown) inside connector insert 400 are biased such that they emit light. This light may be passed by light pipe 460 to opening 412. This light at opening 412 may be viewed by a user to confirm that a connection has been made.

To protect debris from entering opening 412, opening 412 may be filled with a transparent or translucent material. In various embodiments of the present invention, this material may be formed of different substances. In a specific embodiment of the present invention, an adhesive may be used to fill opening 412. The adhesive may fill opening 412 then excess adhesive may be wiped to form a smooth surface with housing 410. This adhesive may be epoxy or other material. In other embodiments of the present invention, plastic or other material may be used. This material may be clear or colored. For example, when more than one indication is provided, various colors may be used to indicate different connection states.

Again, the surface of this material may cause various problems. For example, when an adhesive is used, after it dries, the adhesive may contract leaving behind a bowl-shaped surface. When viewed at a proper angle, this unattractive bowl shape may be visible to a user. Further, this bowl shape may unevenly diffuse light provided by an LED, such that the LED indicator provides a different appearance depending on the angle viewed by a user. Also, the surface may reflect light, providing a false indication to user that a connection has been made. An example of such a bowl-shaped surface is shown in the following figure.

Figure 5:
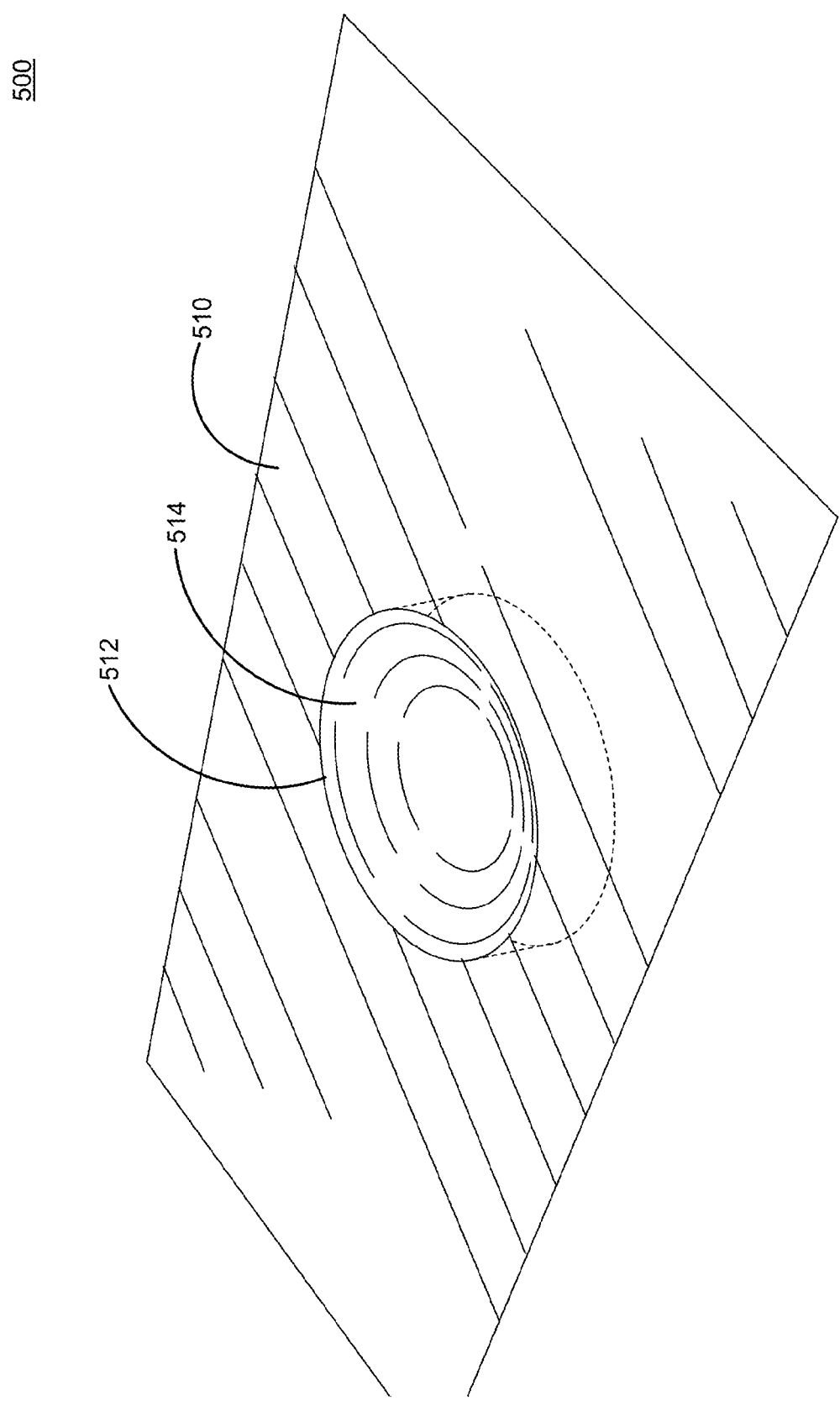
FIG. 5 illustrates an opening in a housing of a connector insert according to an embodiment of the present invention.

FIG. 5 illustrates an opening 512 in a housing 510 of a connector insert according to an embodiment of the present invention. In this example, opening 512 may be filled with an adhesive, such as epoxy. As it dries, surface 514 of the adhesive may form a bowl shape. Again, this bowl shape may be unattractive. Also, it may cause reflections and diffuse light unevenly. Accordingly, embodiments of the present invention provide a texture for surface 514. Examples are shown in the following figure.

Figure 6:
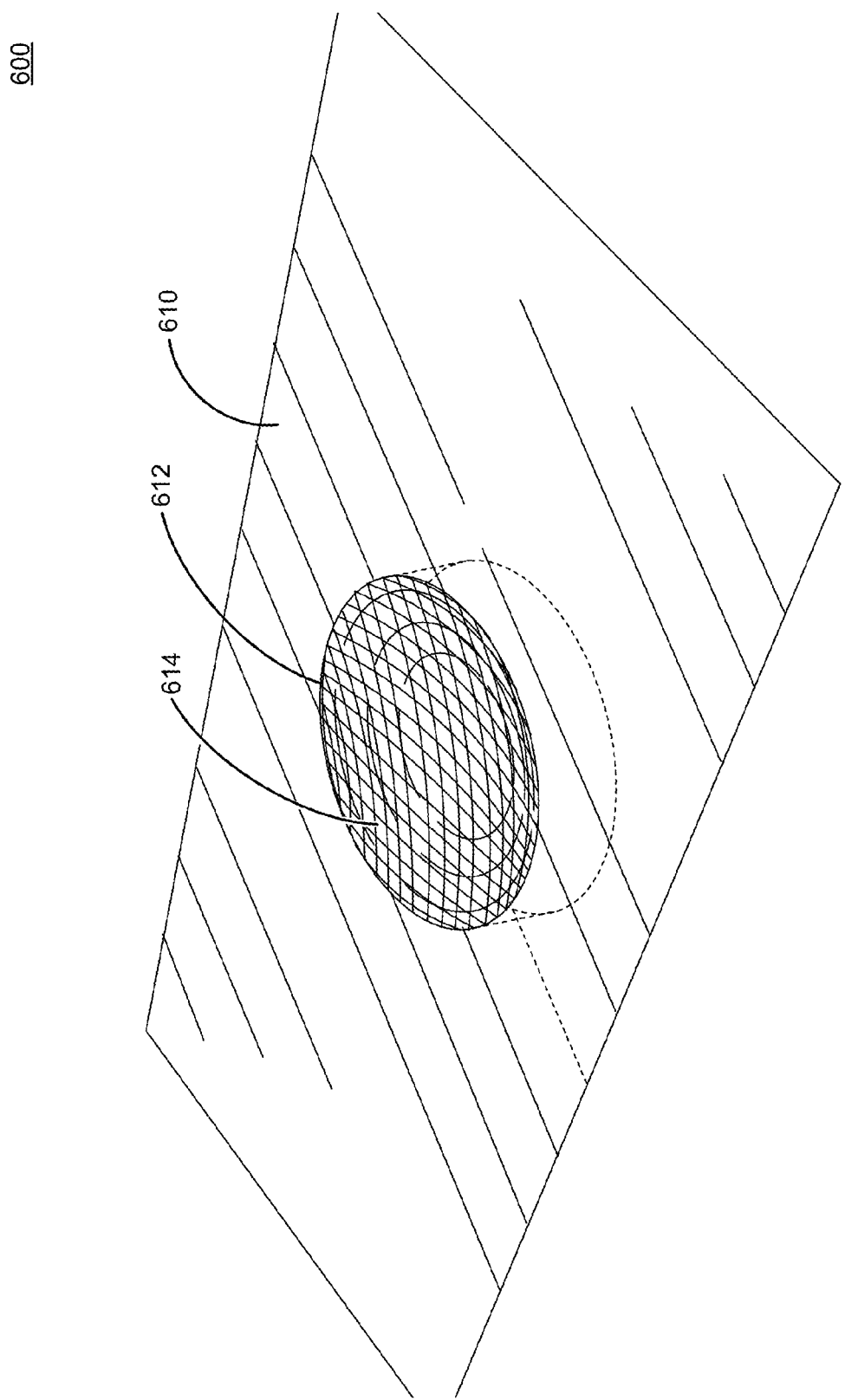
FIG. 6 illustrates a textured surface of an adhesive filling an opening in a housing.

FIG. 6 illustrates a textured surface 614 of an adhesive filling opening 612 in housing 610. In this example, surface 614 may be crosshatched. This may be achieved by use of a laser. Specifically, a laser may etch areas of surface 614 forming the crosshatched pattern. In other embodiments of the present invention, a texture tape, or other pattern or stamp, may be used to form the crosshatched pattern. For example, after filling, but before the adhesive dries, a stamp or textured surface may be pressed against surface 614, leaving the crosshatched pattern. This stamp or textured surface may have an adhesive backing such that it may be manipulated by a person or machine.

In various embodiments of the present invention, only opening 614 is laser etched. In other embodiments of the present invention, some or all of housing 610 may be laser etched. In these embodiments, housing 610 may either be patterned by the laser etch (for example, to provide a desirable texture to the housing), or housing 610 may be formed of a material that is not etched by the laser. In still other embodiments of the present invention, housing 610 may be protected by a mask (not shown). This mask may have an opening corresponding to opening 612. The laser may be used to laser the mask and opening 612, again resulting in the crosshatched pattern shown.

In this example, a crosshatch pattern is shown on surface 614. In other embodiments of the present invention, other patterns may be used. For example, checkerboard, corporate logos, fractal patterns, or other shapes and patterns may be used. These patterns diffuse light provided by a light-emitting diode such that surface 614 does not reflect light, and such that the light provided as an indication appears consistent regardless of an angle viewed by a user.

In this example, an at least somewhat repeatable pattern may be used to texture surface 614. In other embodiments of the present invention, other techniques that result in a nonrepeating pattern may be used. An example is shown in the following figure.

Figure 7:
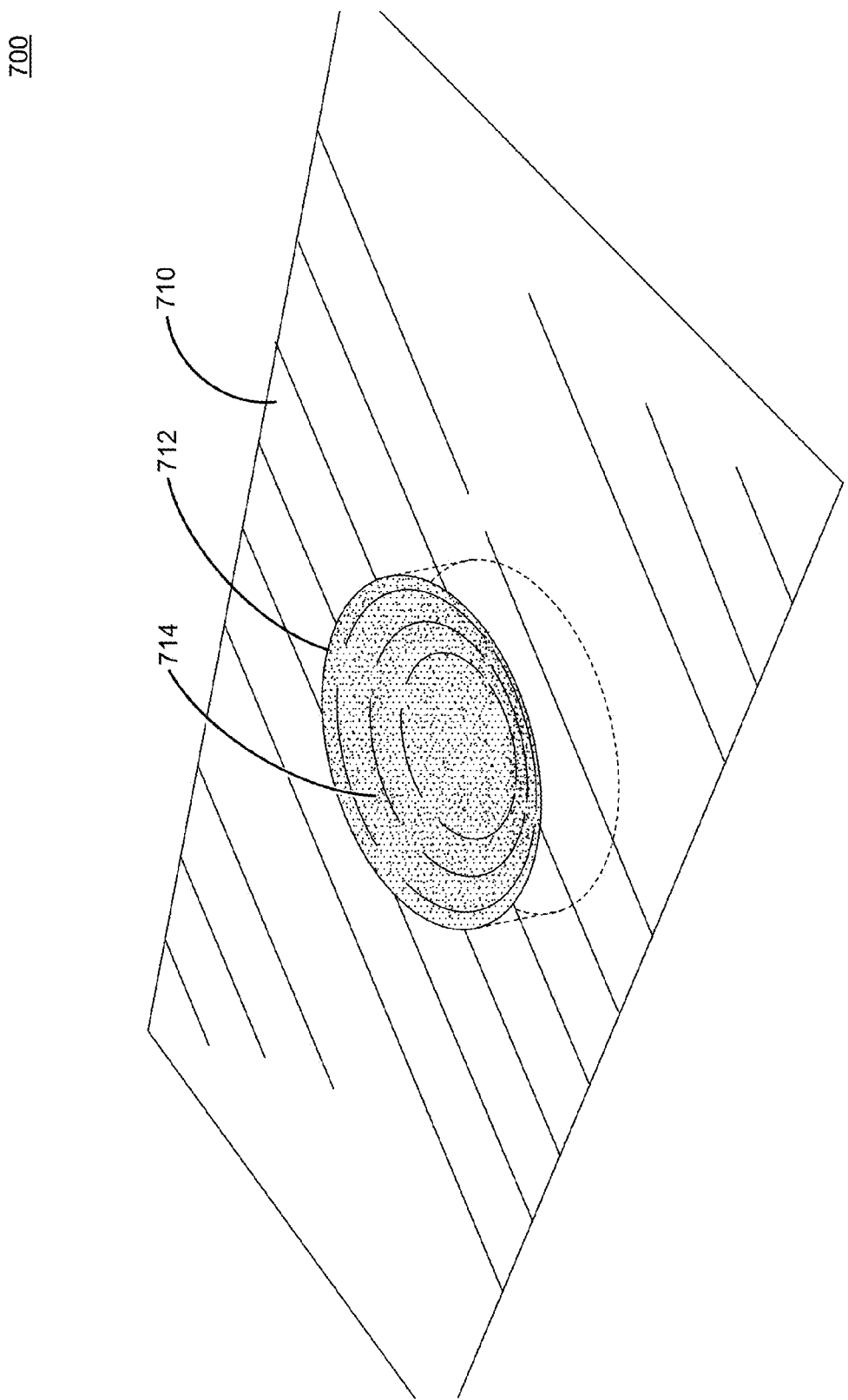
FIG. 7 illustrates a textured surface of an adhesive filling an opening in a housing.

FIG. 7 illustrates a surface 714 of an adhesive, such as an epoxy, filling opening 712 in housing 710. In this example, surface 714 may be textured in an irregular or nonrepeating manner. For example, a chemical etch, or blasting with sand or beads, may be used to texture surface 714.

Again, surface 714 and some or all of housing 710 may be etched in this manner. Housing 710 may be etched (for example, it may have a desirable feel after etching), or it may be made of a material that is resistant to the etching process used. In still other embodiments of the present invention, some or all of housing 710 may be masked to protect it from the etching process.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A connector comprising:
   an indication structure on the connector, the indication structure comprising:
   a light-emitting diode; and
   a light pipe between the light-emitting diode and an opening in a housing of the connector, wherein the opening in the housing of the connector is filled with an adhesive;
   wherein a surface of the adhesive is textured to diffuse light emitted by the light-emitting diode and to reduce reflections at the surface of the adhesive.

2. The connector of claim 1 wherein the connector is a connector receptacle.

3. The connector of claim 1 wherein the surface of the adhesive is textured using a chemical etch.

4. The connector of claim 1 wherein the surface of the adhesive is textured using a laser.

5. The connector of claim 1 wherein the surface of the adhesive is textured using glass beads.

6. The connector of claim 1 wherein the surface of the adhesive is textured using sand.

7. The connector of claim 1 wherein before texturing, a body of the connector is masked.

8. The connector of claim 1 wherein the connector is a connector insert.

9. The connector of claim 8 wherein the surface of the adhesive is textured using a chemical etch.

10. The connector of claim 8 wherein the surface of the adhesive is textured using a laser.

11. A connector comprising:
    a housing having an opening; and
    a light-emitting diode to emit light through the opening in the housing,
    wherein the opening in the housing of the connector is filled with an adhesive, and
    wherein a surface of the adhesive is textured such that light emitted by the light-emitting diode is diffused and reflections at the surface of the adhesive are reduced.

12. The connector of claim 11 wherein the connector is a connector insert.

13. The connector of claim 11 wherein the surface of the adhesive is textured using a chemical etch.

14. The connector of claim 11 wherein the surface of the adhesive is textured using a laser.

15. The connector of claim 11 wherein the surface of the adhesive is textured using glass beads.

16. The connector of claim 11 wherein the surface of the adhesive is textured using sand.

17. The connector of claim 11 wherein before the surface of the adhesive is textured, a body of the connector is masked.

18. The connector of claim 11 wherein the light-emitting diode emits light when the connector is mated with a second connector.

19. The connector of claim 11 wherein the connector is a connector receptacle.

20. The connector of claim 12 wherein the connector further comprises:

a light pipe between the light-emitting diode and the opening in the housing of the connector.

* * * * *